No. 776,106. PATENTED NOV. 29, 1904.
A. BEURRIER.
APPARATUS FOR RAISING FLUIDS BY SOLAR HEAT.
APPLICATION FILED DEC. 23, 1901.
NO MODEL.
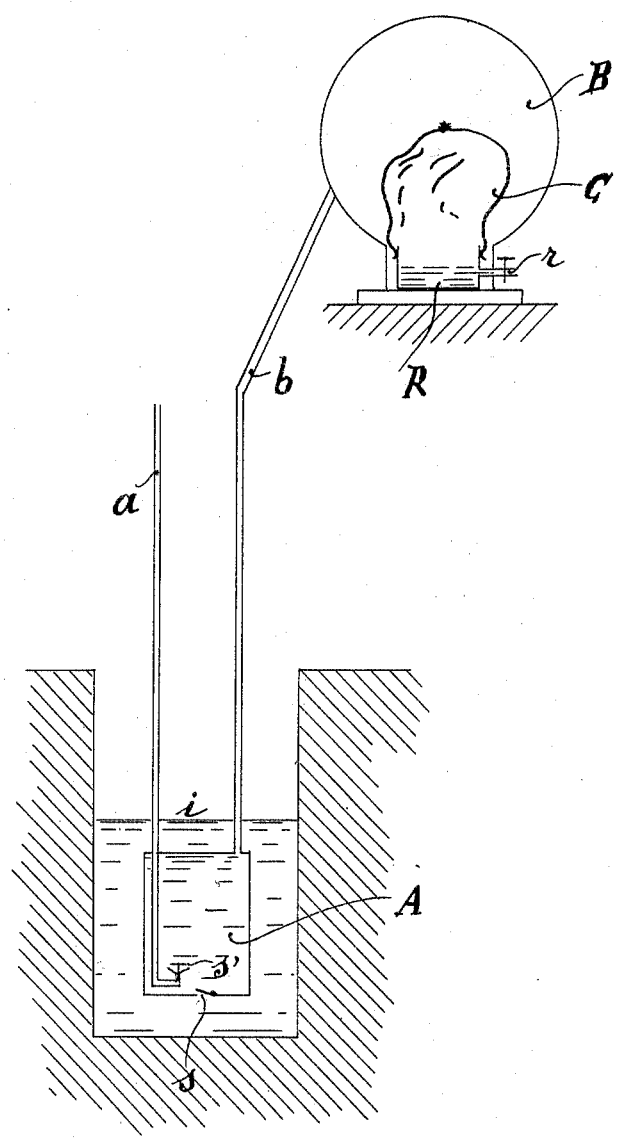

No. 776,106.

Patented November 29, 1904.

UNITED STATES PATENT OFFICE.

ALEXIS BEURRIER, OF MONTGUYON, FRANCE.

APPARATUS FOR RAISING FLUIDS BY SOLAR HEAT.

SPECIFICATION forming part of Letters Patent No. 776,106, dated November 29, 1904.

Application filed December 23, 1901. Serial No. 86,994. (No model.)

*To all whom it may concern:*

Be it known that I, ALEXIS BEURRIER, a citizen of the Republic of France, residing at Montguyon, Charente - Inférieure, France, have invented Improvements in Apparatus for Raising Fluids by Solar Heat, of which the following is a specification.

This invention has for its object to provide a novel thermo apparatus for raising fluids founded on the principle of the variation of the pressure of gases according to the temperature and in employing the solar heat and the difference in temperature during night and day to effect its purpose.

The invention is illustrated by the accompanying drawing, which represents a vertical sectional elevation.

The apparatus is constructed in the following way: A closed cylinder or vessel A, provided with a valve S, opening inward, is entirely submerged in the fluid $i$, which is to be raised, (in a well, cistern, or the like.) Another vessel, B, also closed and of a greater capacity than the first, is situated in a position where the temperature is subject to variations—*e. g.*, in front of a wall which is exposed to the sun. This vessel may even be partially surrounded by a curved reflector to increase the temperature by radiation. In the interior of this exposed vessel B is a small reservoir R, over which is fitted a rubber bag C, the reservoir being provided with a cock $r$, through which ammonia or any other volatile fluid can be introduced. A pipe $b$ connects the submerged and exposed vessels together, and another pipe, $a$, which projects down to the bottom of the submerged vessel, is conducted to the reservoir to which the water is to be supplied and acts as a delivery-pipe.

The apparatus works as follows: The apparatus being at rest, with the reservoir-cock open, the water enters through the valve in the submerged vessel and ascends until it is at the same level as the water in the well, the pressure being the same in both the vessels. Liquid ammonia is introduced into the reservoir through the cock, (such an amount that it cannot volatilize and that its vapor is kept in a state of saturation,) and the cock is then shut. During the day-time as the temperature rises the pressure of the ammonia-gas increases and the rubber bag expands until it fills up the interior of the exposed vessel, and the air contained in this latter is thus forced down into the submerged vessel, causing the water to rise in and escape out of the delivery-pipe. In order to prevent the submerged vessel from quite emptying itself, (which would cause the rubber bag to burst, the counter-pressure being removed,) a floating-valve device $s'$ is so mounted on the inner end of the delivery-pipe that it closes when the level of the water in the submerged vessel sinks to its lowest point. In the night-time the temperature falls, the ammonia-gas pressure sinks and the gas liquifies, the rubber bag reassumes its initial form, and in consequence of the pressure in the submerged vessel the water in the well, cistern, or the like finds its own level in the submerged vessel and next day the operation repeats itself. This takes place daily or every time that the temperature of the exposed vessel varies.

I claim—

In an apparatus for raising fluids by solar heat through the medium of a volatile fluid, the combination of a closed vessel subjected to the variations of temperature produced by the sun; a reservoir within said closed vessel and containing the volatile fluid; an expansible bag, also within said closed vessel and fitted over said reservoir; a second closed vessel entirely submerged in the fluid to be raised, connected to the first-mentioned closed vessel by a pipe and provided with an inwardly-opening valve past which the fluid to be raised may flow and another pipe connecting the lower portion of the second - mentioned closed vessel with the point to which the fluid is to be raised.

In testimony whereof I have affixed my signature in presence of two witnesses.

ALEXIS BEURRIER.

Witnesses:
 LOUIS TRICOT,
 CLYDE C. TOURGIE.